United States Patent [19]

Ohmura et al.

[11] Patent Number: 5,346,030
[45] Date of Patent: Sep. 13, 1994

[54] REAR-WHEEL STEERING APPARATUS FOR VEHICLES

[75] Inventors: Hiroshi Ohmura, Hatsukaichi; Masanobu Kosaka, Kure; Koji Hosoda, Hiroshima, all of Japan

[73] Assignee: Mazda Motor Corporation, Hiroshima, Japan

[21] Appl. No.: 10,992

[22] Filed: Jan. 29, 1993

[30] Foreign Application Priority Data

Jan. 31, 1992 [JP] Japan ............................ 4-017092

[51] Int. Cl.$^5$ ............................................. B62D 7/00
[52] U.S. Cl. ......................................... 180/140; 280/91
[58] Field of Search ................. 180/140, 142, 143; 280/91

[56] References Cited

U.S. PATENT DOCUMENTS

| | | | |
|---|---|---|---|
| 4,896,737 | 1/1990 | Kanazawa et al. | 180/140 |
| 4,953,649 | 9/1990 | Kawai et al. | 180/140 |
| 4,953,652 | 9/1990 | Ohmura et al. | 180/140 |
| 5,048,627 | 9/1991 | Eguchi et al. | 180/140 |

FOREIGN PATENT DOCUMENTS 57-44568A   3/1982   Japan.
2-249765A  10/1990   Japan.

*Primary Examiner*—Mitchell J. Hill
*Attorney, Agent, or Firm*—Staas & Halsey

[57] ABSTRACT

A rear-wheel steering apparatus having a high-speed step motor revolving in accordance with a target steering angle ratio and a power cylinder for converting a change of the revolved angle of the motor to an amount of steering angle of rear wheels with a power assist by a hydraulic power. When a failure is detected in the rear-wheel steering system when the steering angle ratio is changed from in-phase to opposite phase, an oil pressure is released out of the power cylinder simultaneously with an interruption of current supply to the motor.

16 Claims, 13 Drawing Sheets

REAR-WHEEL STEERING APPARATUS FOR VEHICLES

BACKGROUND OF THE INVENTION

The present invention relates to a rear-wheel steering apparatus having an electric motor to perform phase inversion control of a steering angle ratio of rear wheels in case of turning. More particularly, it relates to assurance of safety in case of failure in a control system of rear-wheel steering.

A steering angle ratio $\theta_S$ is defined by a ratio $(\theta_R/\theta_F)$ of a steering angle $\theta_F$ of front wheel with respect to a steering angle $\theta_R$ of rear wheel.

A rear-wheel steering apparatus for vehicles is generally arranged so as to control the rear wheels so that the steering angle of the rear wheels becomes a predetermined value in accordance with the steering angle of front wheels. This control is performed by a ratio control in accordance with a predetermined steering-angle-ratio set corresponding to vehicle speed. The ratio control is called a speed sensitive type rear-wheel steering apparatus.

In such apparatus, in order to secure a direction stability of vehicle, it is generally controlled so that the steering angle ratio becomes a positive value in an intermediate to high speed region. That is, it is controlled so that directions of steering angles of the front and rear wheels are in an in-phase state side when the steering handle begins to turn. However, since this is performed as a ratio control, the rear wheels are steered (turned) to an in-phase state. Accordingly, sufficient head rotatability cannot be obtained.

To solve the above problem, a phase inversion type rear-wheel steering apparatus is suggested in Japanese Patent Publication Kokai Nos. 57-44568 and 2-249765. The apparatus is capable of detecting a yaw rate signal by a yaw movement of vehicle, and turn the rear wheels to a phase which is opposite to that of front wheels immediately after the front wheels start to be steered, and then to an in-phase state in accordance with an occurrence of the yaw rate signal. This is so called a "phase inversion control by yaw rate feed back". Head rotatability and direction stability are balanced by this control.

Accordingly, in the phase inversion control by yaw rate feed back, it is extremely important that a steering angle ratio is changed from the opposite phase to in-phase and is performed in a short time immediately after the front wheels have begun to turn. In the phase inversion type steering angle apparatus, it is suggested that a high-speed motor be used in order to change the steering angle ratio from the opposite phase to in-phase in a short time.

On the other hand, in a rear-wheel steering apparatus which is arranged so that rear wheels are actually driven by a hydraulic power cylinder and the steering angle ratio is controlled by an electric motor such as a step motor, a spring is provided in the cylinder so as to force the rear wheels at a neutral position for fail-safe operation, if the oil pressure is not adequate and a release circuit is also provided on a hydraulic circuit. If it is detected that the step motor fails to open, the oil pressure is let out from the cylinder through the release circuit and the spring forces the rear wheels to return to the neutral position (so called "2WS position") for extra safety in case of failure.

However, when the high speed motor is adopted to the conventional rear-wheel steering apparatus which performs the phase inversion control by controlling a steering angle ratio, there appears a specific problem which did not arise in the past. This problem is discussed with reference to FIG. 1.

In the rear-wheel steering apparatus for a vehicle, since a high degree of oil pressure is supplied to the hydraulic power cylinder which is a driving source for steering the rear wheels, if the release circuit releases the oil pressure in a short time, a sudden change is caused in the steering angle of the rear wheels and it is too risky for the vehicle even for fail-safe operation. Therefore, in the prior art, an orifice is provided on a release line of the release circuit and the oil pressure is slowly reduced so that the movement of vehicle gradually changes.

FIG. 1 is a diagram to explain the operation of the speed sensitive type steering apparatus having the above-described power cylinder. In FIG. 1, when a failure is detected in the apparatus and the oil pressure is released at the time $t_1$, the oil pressure in the power cylinder gradually decreases as shown by curve b. The rear wheels reach the neutral position at the time $t_3$ where the oil pressure in the power cylinder and a repellent force of the spring in the cylinder are balanced. In a speed sensitive type rear-wheel steering apparatus which does not perform the phase inversion control, even if a failure occurs in a process where the phase of the steering angle ratio is changed from in-phase to opposite phase, the problem will not arise since the change of the steering angle ratio is gradual and the oil pressure has been released by the time ($t_3$ of FIG. 1) prior to the time $t_4$ where the phase comes to the opposite phase where rotatability is emphasized.

As described above, in the rear-wheel steering apparatus which performs the phase inversion control by controlling the steering angle ratio, the phase inversion is performed at extremely high speed in comparison with the speed sensitive type apparatus. Therefore, a case as shown in the graph d of FIG. 1 is assumed in which a failure has occurred when a steering angle ratio is going to change due to a driver's steering operation when the steering angle ratio is in in-phase state. If the failure is one occurring to the high speed motor for steering angle ratio control, the steering angle ratio has changed from in-phase to opposite phase while the oil pressure still remains in the power cylinder (that is, between time $t_1$ and time $t_3$ where the rear wheels come to the neutral state). During the period between time $t_1$ and $t_3$, a movement which cannot be expected by a driver may be caused to the vehicle.

This problem arises when the high speed motor is adopted in the phase inversion type steering apparatus. Furthermore, this problem will remain as long as the high speed motor means is used and the failure occurs where the oil pressure supplied to the power cylinder needs to be released regardless of the fact that the failure occurred in a control system of the motor.

SUMMARY OF THE INVENTION

Accordingly, in the light of the above problem, it is an object of the present invention to suggest a rear-wheel steering apparatus in a phase inversion type steering apparatus operated by controlling a steering angle ratio by a motor, in which the movement of vehicle is assured to be stable, in case of a failure occurs which needs to release an oil pressure which is a power source to drive the rear-wheel steering.

According to the present invention, the foregoing object is attained by providing a rear-wheel steering apparatus which controls a phase inversion of a steering angle ratio of rear wheels when a vehicle is turned, comprising:

electric motor means for setting the steering angle ratio of the rear wheels adjustably with respect to the steering angle of front wheels;

hydraulic driving means for driving the rear wheels with an oil pressure in accordance with the steering angle ratio set by said electric motor means;

detection means for detecting a failed state in a rear-wheel steering control system;

a fail-safe valve for releasing the oil pressure from said hydraulic driving means in order to force to return the steering angle of the rear wheels to a neutral position; and control means for forcing to interrupt said electric motor means and controlling said fail-safe valve so as to release the oil pressure from said hydraulic driving means in accordance with a detection of the failed state.

It is another object of the present invention to suggest a rear-wheel steering apparatus capable of detecting a state of the failure in a short time when the steering-angle-ratio is set by a high speed motor.

It is still another object to suggest a rear-wheel steering apparatus capable of efficiently maintaining the movement of a vehicle body in case of turning at an intermediate speed or high speed region.

Furthermore, it is another object to suggest a rear-wheel steering apparatus capable of simultaneously enabling the fail-safe valve and forcing to interrupt the electric motor means.

Still further, it is another object to suggest a rear-wheel steering apparatus capable of maintaining movement stability of the vehicle body in the case where a spring is provided which sets the left rear wheel and right rear wheel at a neutral position when the oil pressure is released out of the fail-safe valve.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated and constitute a part of the specification, illustrate embodiments of the invention and, together with the description, serve to explain the principles of the invention.

DESCRIPTION OF THE PREFERRED EMBODIMENTS

Preferred embodiments of the present invention will now be described in detail in accordance with the accompanying drawings.

The features of the rear-wheel steering apparatus of this embodiment are as follows:

(1): Mechanical features:
  (1)-1: A high-speed step motor is adopted to a steering-angle-ratio adjusting mechanism in order to change the steering-angle ratio $\theta_S$ in accordance with the vehicle speed;
  (1)-2: A spring is provided in a hydraulic power cylinder for steering rear wheels in order to forcefully return the rear wheels to a neutral position in case of failure;
  (1)-3: A hydraulic release circuit is provided in order to easily return the rear wheels to the neutral position in case of failure; and
  (1)-4: In order not to return the rear wheels to the neutral position in a short time in case of a failure, an orifice is provided to control the amount of released oil via the release circuit per a determined time unit .

(2): Functional allotment is realized by adopting two (master and slave) CPUs to the motor control, and the master CPU actually controls the motor and the slave CPU detects failures. Since a load of the slave CPU is light, an inexpensive slave CPU is allowed to use.

(3): In order to immediately detect a failure in the steering-angle-ratio control system:
  (3)-1: The master and slave CPU's calculate a target steering-angle ratio ($TG\theta_S$) in the same manner and the results are compared in the slave CPU. If they do not coincide, a driving current to the motor is interrupted;
  (3)-2: The slave CPU compares the change direction of a target steering angle from the current steering angle with an actual direction of revolution of the motor obtained from a phase difference of driving current supplied to the motor. If they do not coincide, supplying of the driving current to the motor is inhibited. The phase difference between the driving currents is detected by monitoring an actual current supplied to each driving coil in the motor.

(4): When a failure is detected, the oil pressure is let out of the power cylinder and the slave CPU forcefully stops the motor. The simultaneous operations of motor rotation interruption and hydraulic release will eliminate an instability of vehicle movement which may be caused by an orifice of the release circuit which delays the rear wheels to return to the neutral position.

Functional Structure of the Four-wheel Steering Apparatus

Figure 2:
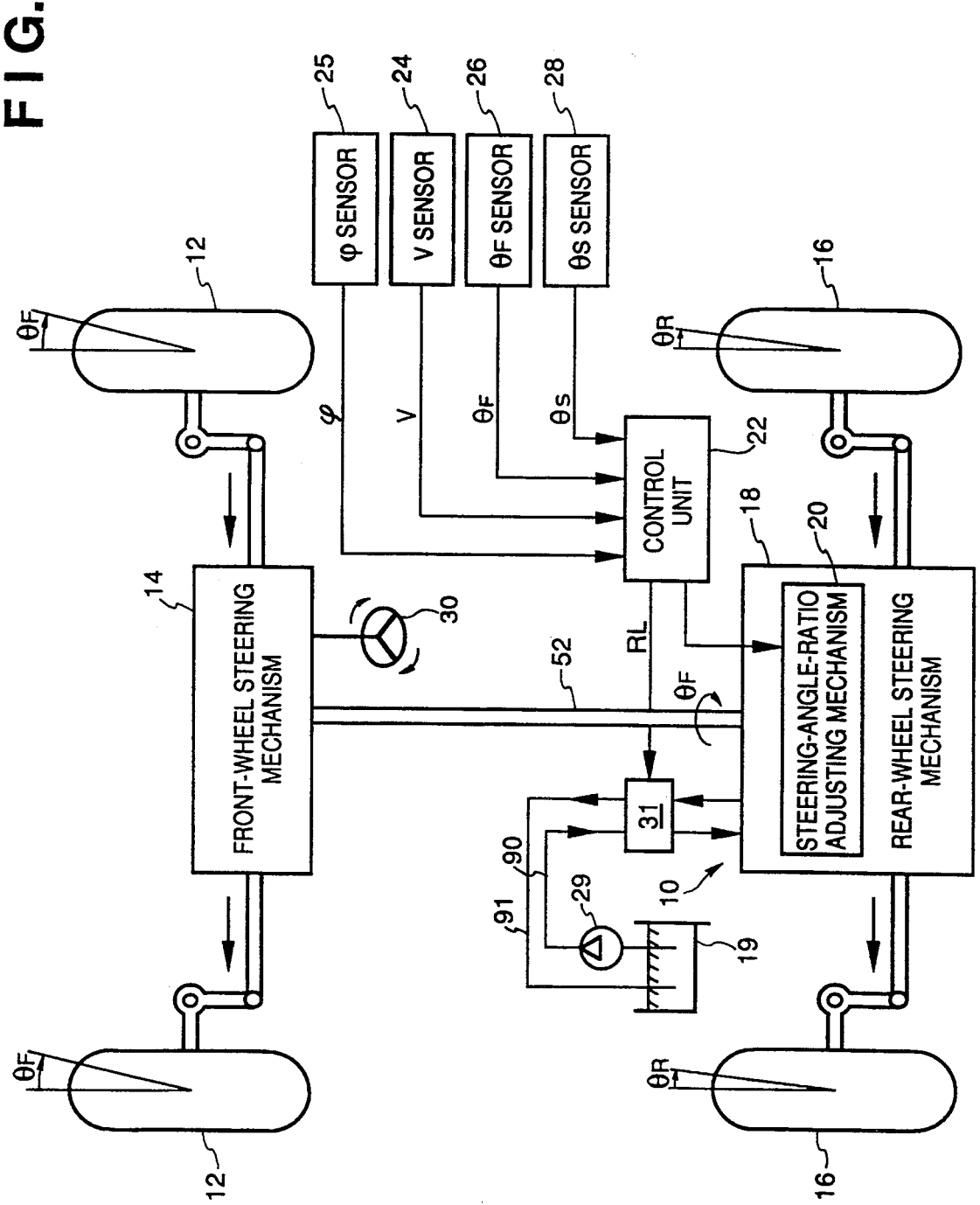
FIG. 2 is a diagram to explain the construction of four-wheel steering system of a preferred embodiment of the invention.

FIG. 2 illustrates the structure of the four-wheel steering system of the present embodiment.

As shown in FIG. 2, the rear-wheel steering apparatus 10 comprises a rear-wheel steering mechanism 18, steering-angle-ratio adjusting mechanism 20 for setting and adjusting a steering-angle ratio $\theta_S$, and 20 control unit 22 for controlling the steering-angle-ratio adjusting mechanism 20. The rear-wheel steering mechanism 18 is functionally connected to a front-wheel steering mechanism 14 for steering front wheels 12 through a transfer shaft 52 and controls rear wheels 16 so that an angle becomes a predetermined target steering angle $TG\theta_R$ in accordance with the steering angle of the front-wheel steering angle $\theta_F$ which is inputted from the front-wheel steering mechanism 14. The steering-angle-ratio adjusting mechanism 20 is provided in the rear-wheel steering mechanism 18, and sets and adjusts the steering-angle ratio $\theta_S$ which is expressed as a ratio of the rear-wheel steering angle $\theta_R$ with respect to the front-wheel steering angle $\theta_F$. The control unit 22 inputs signals of a vehicle speed V from a speed sensor 24, front-wheel steering angle $\theta_F$ from a front-wheel steering sensor 26 (provided on the steering shaft), steering-angle-ratio $\theta_S$ from a steering angle ratio sensor 28, and yaw rate signal $\phi$ from a yaw rate sensor 25.

As will be described later, in the present steering system, rear wheels are steered by hydraulic power. The source of supply for an oil pressure is a pump 29 of FIG. 2. The pump 29 transfers oil stored in an oil tank 19 to a hydraulic release circuit 31 through a pipe 90. The release circuit 31 is a circuit to let oil pressure out of the steering mechanism 18 so that the rear wheels are forced to return to the neutral position in case of a failure. Numeral 91 is a return pipe from the steering mechanism 18.

The steering-angle-ratio adjusting mechanism 20 is controlled in accordance with so-called "phase inversion" control of the control unit 22 so that the steering-angle-ratio $\theta_S$ becomes negative immediately after the front wheels are steered and then it changes to positive after that, when the front wheels are turned from the steering angle 0° in the intermediate speed and high speed regions.

Figure 3:
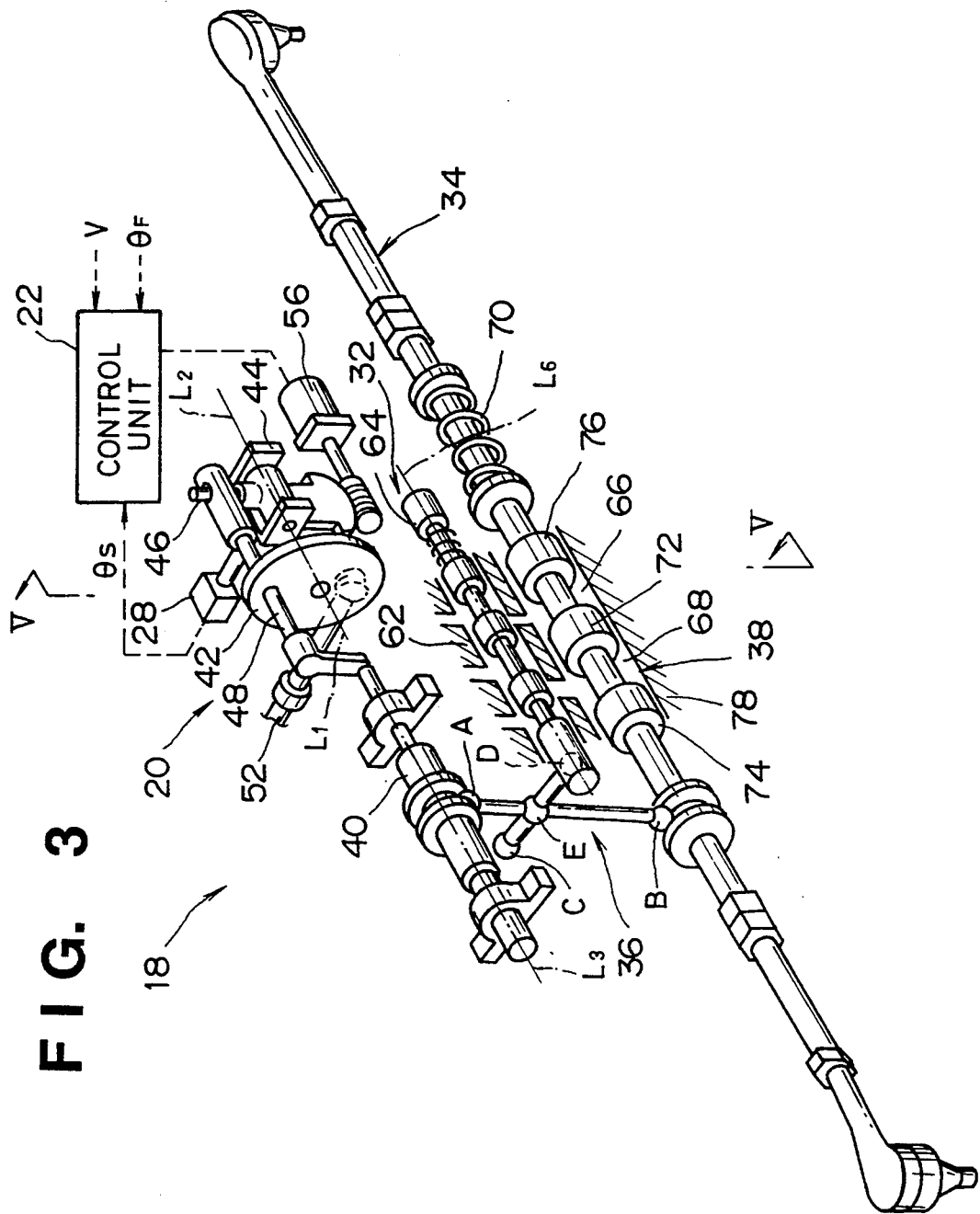
FIG. 3 is a diagram to explain the main portion of the rear-wheel steering apparatus of the embodiment indicated in FIG. 2.
Figure 4:
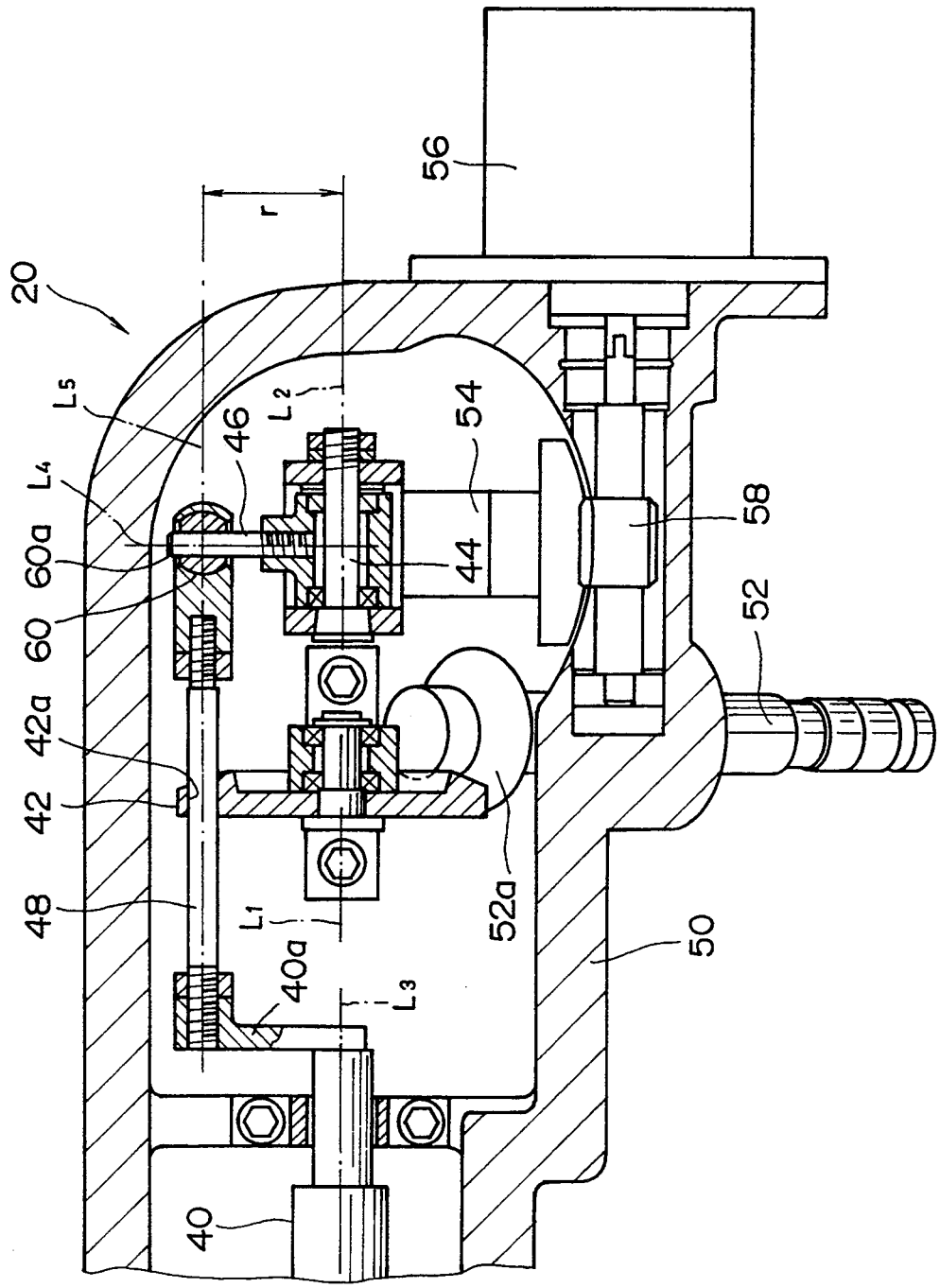
FIG. 4 is a diagram to explain the main portion of the steering-angle-ratio adjustment mechanism of FIG. 2.

FIG. 3 is a perspective view illustrating the rear-wheel steering mechanism 18 and FIG. 4 is a detailed view of the steering-angle-ratio adjusting mechanism 20 of the rear-wheel steering mechanism 18 in a direction of V—V of FIG. 3.

As shown in FIG. 3, the rear-wheel steering mechanism 18 comprises the steering-angle-ratio adjusting mechanism 20, hydraulic switch valve 32, rear-wheel steering rod 34, displacement transfer mechanism 36, and hydraulic power cylinder 38.

The steering-angle-ratio adjusting mechanism 20 has an output rod 40, bevel gear 42, yaw shaft member 44, pendulum arm 46, and coupling rod 48. These are accommodated in a case 50 as shown in FIG. 4.

The output rod 40 is supported by the case 50 and capable of oscillating in the direction of axis $L_3$. The rear-wheel steering rod 34 is displaced in the direction of the axis $L_3$ (to the vehicle width) through the displacement transfer mechanism 36 by stroke displacement to the axis $L_3$. Accordingly, the rear wheels which connect to both ends of the rear-wheel steering rod 34 are steered.

The bevel gear 42 is supported by the case 50 and capable of rotating around the axis $L_3$ of the output rod 40 and axis $L_1$. It is arranged so that as a pinion 52a of an end portion of a transfer shaft 52 which engages with the bevel gear 42 rotates around the axis $L_1$ the steering wheel 30 turns. That is, the front-wheel steering angle $\theta_F$ is inputted to the rear-wheel steering mechanism 18 through the transfer shaft 52 from the front-wheel steering mechanism 14.

The yaw shaft member 44 has an axis $L_2$ capable of locating on the same position as the axis $L_3$ of the output rod 40 and is fixed to a yawing gear 54. The gear 54 is engaged with a worm gear 58 which rotates by a servomotor 56 controlled by the control unit 22, and is rotated around a vertical axis which intersects with the axis $L_2$, thus making the yaw shaft member 44 rotate. That is, as apparent from the later description, the servomotor 56 can set the steering-angle-ratio variably in accordance with the position of rotated angle thereof.

The pendulum arm 46 is connected to the yaw shaft member 44 capable of yawing around the axis $L_2$ of the yaw shaft member 44 and a connecting position to the yaw shaft member 44 is determined so that the axis $L_4$ of the pendulum arm 46 crosses an intersection of the rotating axis and axis $L_2$ of the yaw shaft member 44.

The coupling rod 48 has an axis $L_5$ which is parallel to the axis $L_3$ of the output rod 40, and is connected to the output rod 40, bevel gear 42, and pendulum arm 46. The coupling rod 48 is connected to the output rod 40 by screwing one of ends of the coupling rod 48 to a lever 40a fixed at the end of the output rod 40. The connection to the bevel gear 42 is performed by connecting the other end of the coupling rod 48 to a hole 42a formed in the bevel gear 42 at the point in a distance r from the axis $L_1$ of the bevel gear 42. The connection to the pendulum arm 46 is performed by connecting the pendulum arm 46 to a hole 60a of ball joint member 60, capable of rotating in all directions, which is provided at the end of the coupling rod 48. Accordingly, the coupling rod 48 is fixed with respect to the output rod 40, but it is capable of oscillating in the direction of axis $L_5$ (that is, the direction of axis $L_3$) with respect to the bevel gear 42, and it is also capable of oscillating in the direction of the axis $L_4$ (that is, the direction which is perpendicular to the axis $L_3$ in the figure) with respect to the pendulum arm 46. Furthermore, the axis $L_4$ of the pendulum arm 46 inclines to the direction which is perpendicular to the axis $L_3$ by revolution of the yaw shaft men, her 44 and the pendulum arm 46 oscillates in this inclined direction. In this movement, an oscillating component in the direction which is perpendicular to the axis $L_3$ is included and a change of included angle of the axes $L_4$ and $L_5$ is absorbed by the rotative operation of the ball joint member 60. Accordingly, the component in the direction which is perpendicular to the axis $L_3$ in a force which is transferred to the coupling rod 48 from the pendulum arm 46 is absorbed in the above connecting point and a relative displacement in the above-described direction is enabled.

Accordingly, since connection between the pendulum arm 46 and coupling rod 48 in the steering-angle-ratio adjusting mechanism 20 can be arranged so as to be a relative displacement in the direction which is perpendicular to the axis $L_3$, a locus of the connecting point of the pendulum arm 46 and coupling rod 48 when the pendulum 46 is rotated is a circular locus or elliptical locus on outer circumferencial surface of the cylinder in which a radius is r with the axis $L_3$ as the center.

Figure 5:
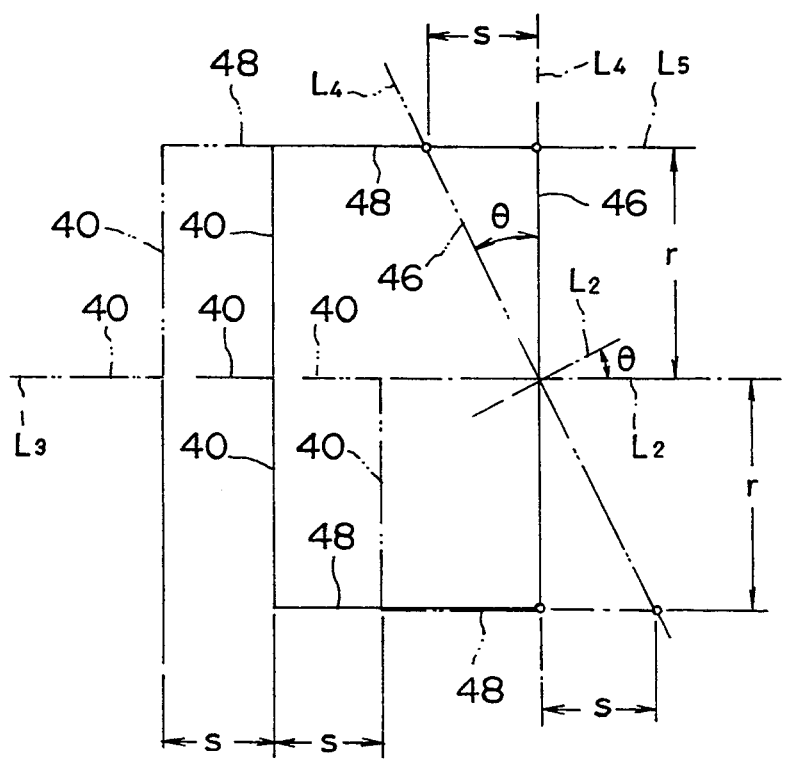
FIG. 5 is a diagram to explain the principle of the operation of the steering-angle-ratio adjustment mechanism of FIG. 4.

FIG. 5 is a diagram illustrating a displacement of the output rod 40 when the axis $L_2$ of the yaw shaft member 44 is inclined $\theta$ degree to the axis $L_3$ of the output rod 40 (that is, the axis $L_4$ of the pendulum arm 46 is inclined $\theta$ degree to the direction which is perpendicular to the axis $L_3$). As apparent from the diagram, even if the pendulum arm 46 is oscillated either in the direction to the right or left, if the amount of oscillation is the same, displacement of the connecting point of the output rod 40 and coupling rod 48 is respectively "S" to the axis $L_3$ and displacement of the output rod 40 is also "S" to the axis $L_3$ since the output rod 40 and coupling rod 48 are fixedly connected.

As described above, the displacement amounts of the output rod 40 to the left and right shown in FIG. 5 are respectively "S" if the oscillation amount of the pendulum arm 46 is equal to each other. However, the displacement "S" varies according to a degree of $\theta$ even if the steering amount of the handle is the same in the oscillation toward the right and left and the amount of rotation of the bevel gear 42 are the same in the oscillation toward the right and left. Therefore, the steering-angle-ratio $\theta_S$ can be set and adjusted by setting and adjusting the inclination $\theta$ of the yaw shaft member 44 by the control of the servomotor 56. Furthermore, the yaw shaft member 44 can be not only inclined in the counterclockwise direction, but also the clockwise direction. In such case, the oscillating direction of the output rod 40 with respect to the rotation of the bevel gear 42 is the opposite to the above case. Accordingly, the rear wheels can be steered to the homologous phase or opposite phase with respect to the steering handle or front wheels.

The steering-angle-ratio $\theta_S$ set and adjusted by the steering-angle-ratio adjusting mechanism 20 can be detected by the steering-angle-ratio sensor 28 provided in the yaw shaft member 44 based on the inclination $\theta$.

The remaining units other than the steering-angle-ratio adjusting mechanism 20 in the rear-wheel steering mechanism 18 are described below and with further reference to FIG. 3.

The hydraulic switch valve 32 is comprised of a valve housing 62 and spool 64 which are adjustably accommodated in the housing 62 in the direction of the axis $L_6$ which is parallel to the axis $L_3$ of the output rod 40. The spool 62 is displaced by the output rod 40 and rear-wheel steering rod 34 through the displacement transfer mechanism 36. The displacement of the spool 64 controls to supply the oil pressure to the hydraulic power cylinder 38. That is, if the displacement is toward the right from the neutral position with respect to the valve housing 62, the oil pressure is supplied to a right oil chamber 66 of the hydraulic power cylinder 38, while if the displacement is toward the left, the oil pressure is supplied to the left oil chamber 68.

The above rear-wheel steering rod 34 is extended to the direction of vehicle width which is parallel to the axis $L_3$ of the rod 40, displaces to that direction, and steers the rear wheels connected to both ends of the rod 40 through a tie rod or knuckle arm which is not indicated in the figure. The above displacement is performed by the oil pressure in the hydraulic power cylinder 38. A centering spring 70 is provided with the rear-wheel steering rod 34. In the case where a hydraulic system comprising the hydraulic switch valve 32 and hydraulic power cylinder 38 is damaged or failed and the oil pressure in the hydraulic power cylinder 38 is lost, or in the case where the mechanical system of the rear-wheel steering apparatus 10 is damaged or failed and the oil pressure is let out of the hydraulic power cylinder 38 by releasing the hydraulic system to a drain, a fail-safe operation is performed by returning the rear-wheel steering rod 34 to the neutral position, by means of the centering spring 70 which positions the rod 34 at the position where the rear wheels are steered for straight drive.

The hydraulic power cylinder 38 displaces the rear-wheel steering rod 34 to the vehicle width by the hydraulic compressive force and a piston 72 is directly fixed on the rear-wheel steering rod 34 and sealing members 74 and 76 which form the left oil chamber 68 and right oil chamber 66 are provided on the right and left of the piston 72. The sealing members 74 and 76 are fixed on housing 78 of the hydraulic power cylinder 38, but these are capable of oscillating with respect to the rear-wheel steering rod 34.

The displacement transfer mechanism 36 engages with the output rod 34, spool 64, and rear-wheel steering rod 34. The mechanism 36 is operated to the direction where the spool 64 is displaced to the predetermined direction by displacement amount of the output rod 40 and to the direction where the spool 64 is displaced to the opposite direction by displacement of the output rod 40.

That is, the displacement transfer mechanism 36 is comprised of a cross-shaped lever which has a vertical lever and lateral lever. The one end A of the vertical lever engages with the output rod 40 and the other end B engages with the rear-wheel steering rod 34. Furthermore, the one end C of the lateral lever engages with the case of the rear-wheel steering apparatus 10 fixed on the vehicle body and the other end D engages with the spool 64. The ends A, B, and D are respectively engaged with the output rod 40, rear-wheel steering rod 34, and spool 64 so that it is capable of oscillating in the direction of the axis, and that it is capable of oscillating and rotating in the other directions. The engaged end C is capable of rotating but incapable of moving by the ball joint.

When the output rod 40 is displaced by stroke displacement, it displaces the rear-wheel steering rod 34 to the axis $L_3$ through the displacement transfer mechanism 36. This operation turns the rear wheels which are connected to both ends of the rear-wheel steering rod 34. However, since the principal of the transfer operation of the amount of steering angle does not directly relate to the present invention and it is described in Japanese Kokai Patent No. Publication 1-273772, a detailed description is omitted here.

As described above, the rear-wheel steering apparatus 10 according to the present embodiment performs the phase inversion control by controlling the steering-angle-ratio adjusting mechanism 20 provided in the rear-wheel steering mechanism 18 which is mechanically connected to the front-wheel steering mechanism 14. When the front wheels 12 are at steering angle 0°, the rear wheels can be mechanically and accurately maintained at the steering angle 0°.

Hydraulic Circuit

The hydraulic circuit for the rear-wheel steering mechanism 18 is described with reference to FIGS. 2 and 6.

As described above, in the steering system, the rear wheels are steered by hydraulic force. The centering spring 70 positions the rear-wheel steering rod 34 at the neutral position in the case where the hydraulic system of the hydraulic switch valve 32 and hydraulic power cylinder 38 is damaged or failed and the oil pressure in the hydraulic power cylinder 38 is lost, or the case where the mechanical system or electric system of the rear-wheel steering apparatus 10 are damaged or failed and the oil pressure is let out of the hydraulic power cylinder 38 by releasing the hydraulic system to the drain. In FIG. 2, the hydraulic release circuit 31 which is located between the pump 29 and steering mechanism 18 is a circuit to let out the oil pressure out of the steering mechanism 18 in order to operate the spring 70.

Figure 6:
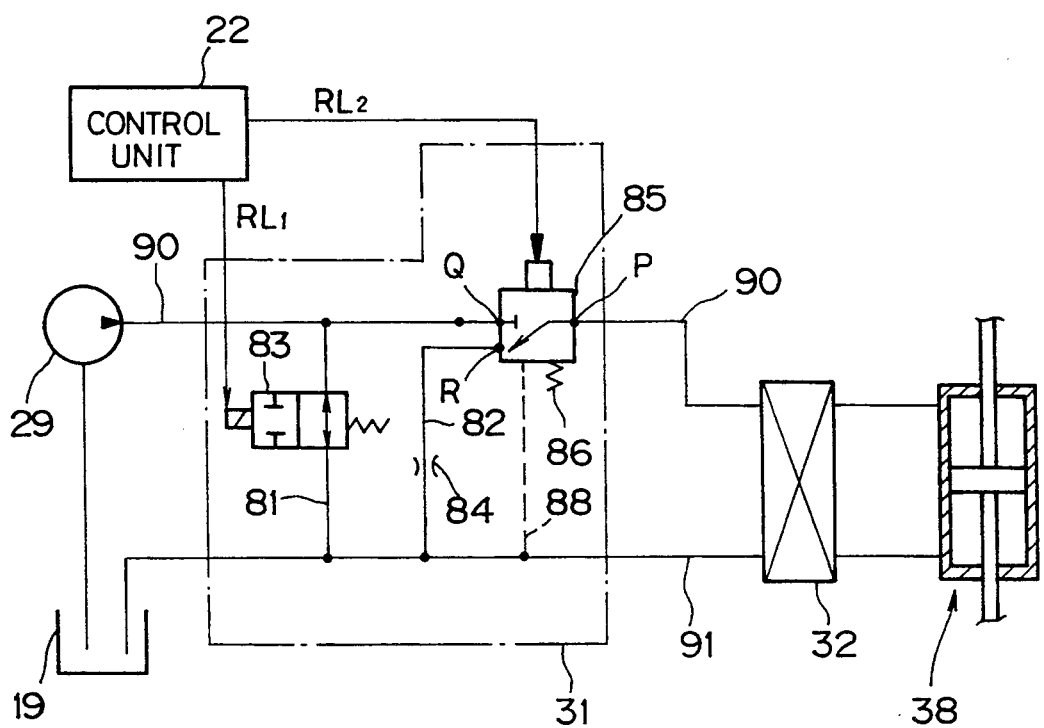
FIG. 6 is a diagram to explain the construction of a hydraulic release circuit of FIG. 2.

The detailed construction of the release circuit 31 is shown in FIG. 6. The circuit 31 has a first release path 81 and second release path 82 which respectively connect to the pipe 90 as a high pressure path and the pipe 91 as a low pressure path. Both paths 81 and 82 are arranged in parallel. The first release path 81 is located near the pump 29 and forms a release path in the pump side, while the second release path 82 is located near the valve 85 and forms a release path in the power cylinder side.

The first release path 81 and second release path 82 respectively are connected to electromagnetic switch valves 83 and 85, respectively. The second release path 82 is connected to an orifice 84. The valve 85 provided between the second release path 82 and pipe 90 is a switch valve having three ports and two positions. The valve 83 is controlled by a signal $RL_1$ from the control unit 22. That is:

$RL_1=1$: Closed
$RL_1=0$: Open

The valve 85 is controlled by a signal $RL_2$ from the control unit 22. That is, when $RL_2=0$, the pipe 90 is branched off to the pump 29 (the first release path 81) side and hydraulic switch valve 32 (the second release path 82) side, and the pipe 90 in the valve 32 side is connected to the second release path 82. On the other hand, when $RL_2=1$, the pipe 90 is connected to the pump 29 (the first released path 81) side and hydraulic switch valve 32 (the second release path 82) side and the second release path 82 is branched off.

Figure 7:
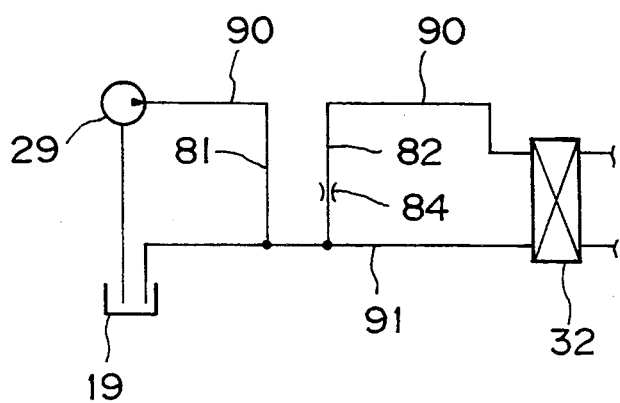
FIGS. 7 and 8 are diagrams to explain the operation of the hydraulic release circuit of FIG. 6.
Figure 8:
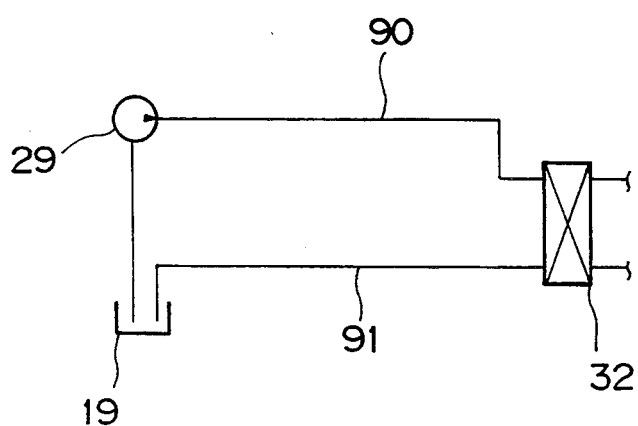

The equivalent circuit when $RL_1=0$, $RL_2=0$ is shown in FIG. 7 and the equivalent circuit when $RL_1=1$, $RL_2=1$ is shown in FIG. 8. As apparent from the circuit of FIG. 9 and the flowchart of FIG. 12, the signals ($RL_1$, $RL_2$) are generated from FAIL signal indicating a failed state which is recognized by the control unit 22.

Construction of the Control Unit

Figure 9:
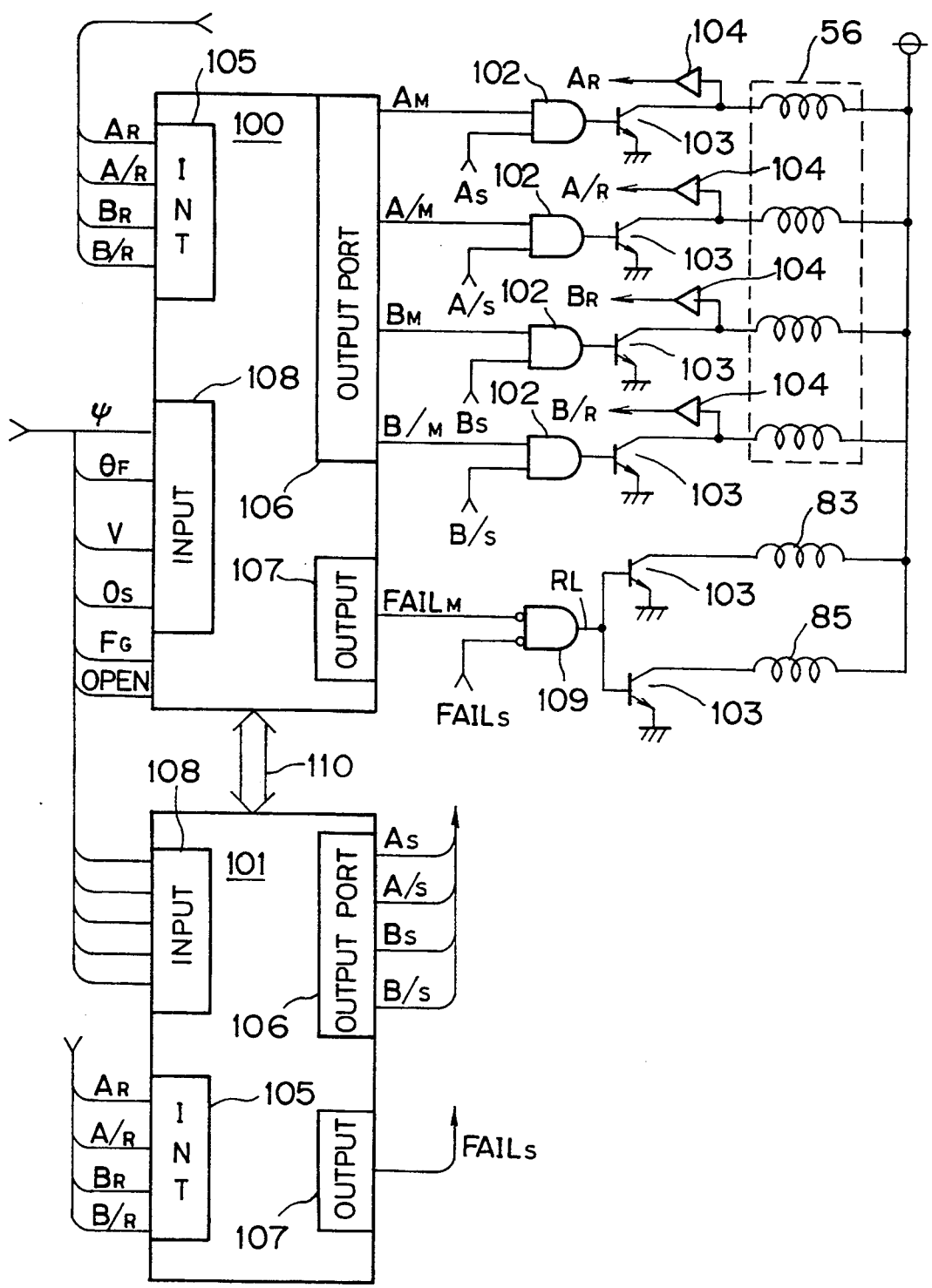
FIG. 9 is a diagram illustrating a circuit of the control unit of FIG. 2.

FIG. 9 is a block diagram illustrating the construction of the control unit 22. As shown in FIG. 9, unit 22 includes a master CPU 100 and slave CPU 101. As understood from the control procedure (FIG. 12) to be described later, only the master CPU 100 actually controls to drive the motor 56. The CPU's 100, 101 have input ports for inputting signals (yaw rate signal $\phi$, front-wheel steering angle $\theta_F$, vehicle speed V, steering-angle-ratio $\theta_S$) from each sensor. The slave CPU 101 executes a calculation in the above manner as that of the master CPU 100 in order to control the motor 56. Exciting signals to drive the motor 56 are A, A/, B, B/. These exciting signals are respectively outputted to each of exciting coils A, A/, B, B/ of the motor 56. For convenience sake, the exciting signals from the master CPU 100 are denoted as $A_M$, $A/_M$, $B_M$, $B/_M$ and the exciting signals from the slave CPU 101 are denoted as $A_S$, $A/_S$, $B_S$, $B/_S$. The notation "/" placed after a signal name indicates an inversion of the signal. Accordingly, the exciting signals $A_M$, $A/_M$, $B_M$, $B/_M$ are outputted from the output ports of the master CPU 100 and the exciting signals $A_S$, $A/_S$, $B_S$, $B/_S$ are outputted from the output ports of the slave CPU 101. The pairs of $A_M$ and $A_S$, $A/_M$ and $A/_S$, $B_M$ and $B_S$, $B/_M$ and $B/_S$ are respectively inputted to each of four AND gates 102. In other words, only when the logical value is "1" in each pair, currents are supplied to the respective exciting coil through each driver 103. The currents supplied to each coil are monitored by each monitoring circuit 104 and inputted to each interruption input port 105 as monitor signals $A_R$, $A/_R$, $B_R$, $B/_R$.

Figure 10:
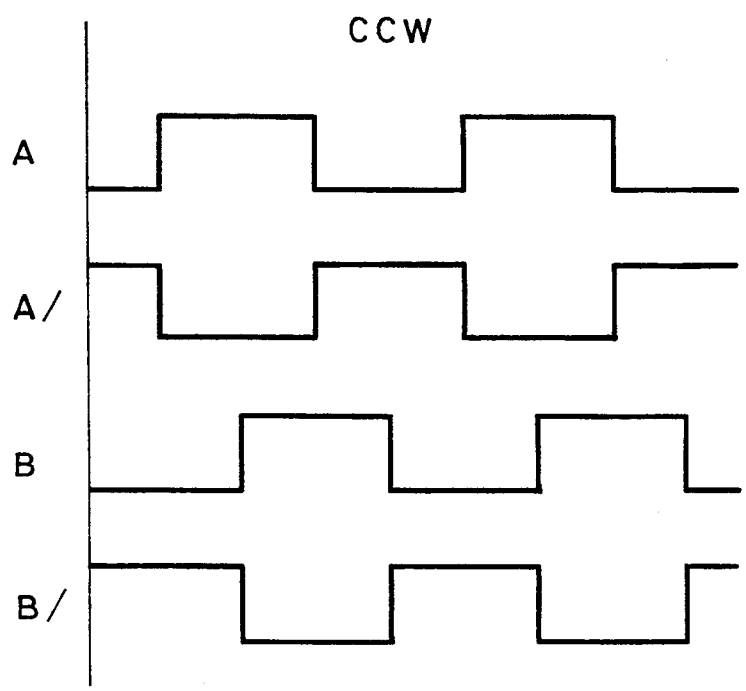
FIGS. 10 and 11 are timing charts to explain the theory for detecting the direction of motor revolution.
Figure 11:
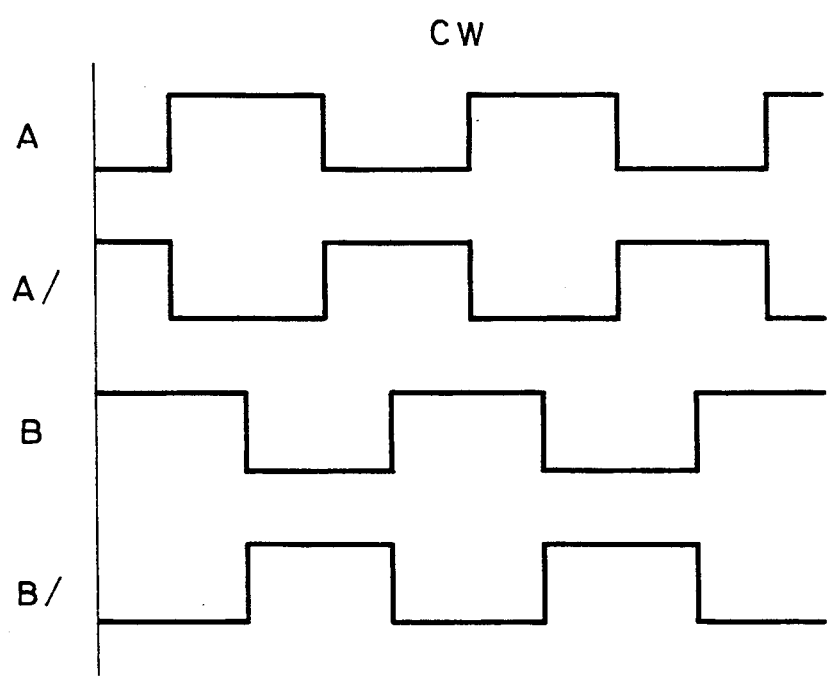

FIGS. 10 and 11 illustrate the relationship of the phases among the exciting signals $A_R$, $A/_R$, $B_R$, $B/_R$ when the motor 56 is revolved in the counterclockwise CCW direction or the clockwise CW direction. Each CPU can monitor the actual direction of revolution of the motor 56 by monitoring and storing a leading edge of each signal in a time sequence. For this monitoring operation, each CPU inputs the signals $A_R$, $A/_R$, $B_R$, $B/_R$ to the interruption input port 105.

According to the timing charts of FIGS. 10 and 11, if the phase of the monitor signals $A_R$, $A/_R$ is inputted earlier than those of $B_R$, $B/_R$, it Can be assumed that the motor 56 is revolving in the CCW direction. On the other hand, if the monitor signals $A_R$, $A/_R$ are inputted later than those of $B_R$, $B/_R$, it can be assumed that the motor 56 is revolving in the CW direction. The monitor signals $A_R$, $A/_R$, $B_R$, $B/_R$ are ones in which the currents supplied to the motor coils are monitored. Therefore, not only the case where the CPU is run away, but also the case when the driver circuit 103 comes to short circuit or open, or the coil comes to short circuit or open, can be recognized as a failure. This is because directions of the monitor revolution do not coincide in these cases.

It is important that detecting the run-away of the motor from the direction of revolution can be performed at an extremely high speed. As the motor of the present embodiment is a step motor of approximately 3000 steps, a failed state can be recognized when the motor has rotated by only one or two steps to the opposite direction. It is not until such rear-wheel steering apparatus as phase inversion and steering-angle-ratio control type is proposed that the high speed detection of motor failure is necessary.

Described above is the theory for detecting the failure. A theory of fail-safe control will now be described. In the present embodiment, when the failure is detected, the driving current to the motor 56 is suspended and the oil pressure supplied to the power cylinder is let out of the cylinder. Failure states in the present embodiment are defined for the following cases:

(1): Failure in motor revolutionary direction, as described above.
(2): The results of calculations by the CPU's of the target steering-angle-ratio $TG\theta_S$ do not coincide.
(3): Open circuit detected in the various sensors.

In FIG. 9, when one of the above cases is recognized, the master CPU 100 outputs a fail signal $FAIL_M$, or the slave CPU 101 outputs a fail signal $FAIL_S$ to an AND gate 109. That is, when either one of $FAIL_M$ and $FAIL_S$ is "1", $RL_1$ and $RL_2$ become "0", a driver 103 is turned off, and solenoid valves 83 and 85 are turned off. When the solenoid valves 83 and 85 are turned off, the release circuit 31 operates to form the release path as shown in FIG. 7.

Figure 12:
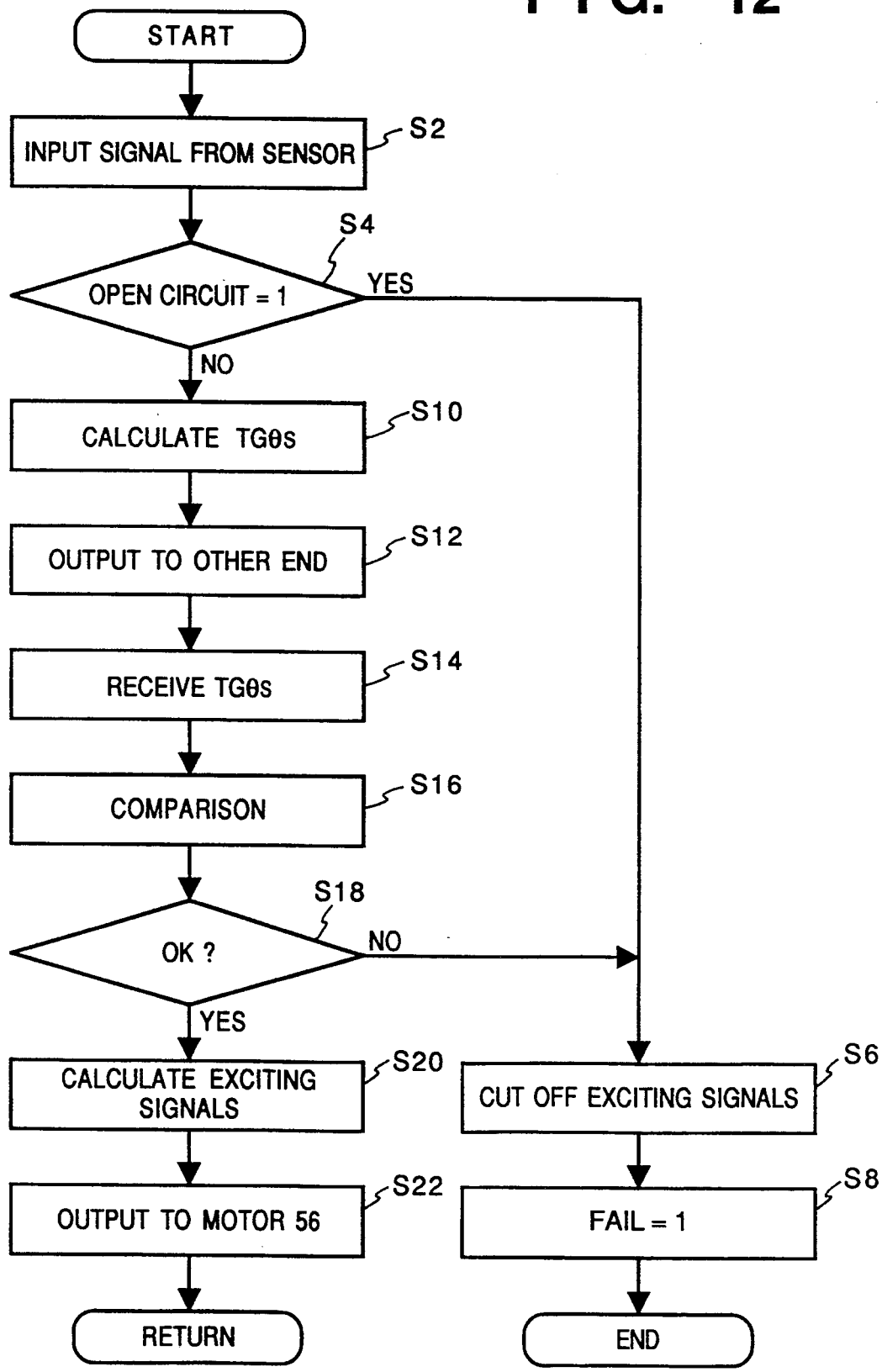
FIGS. 12 and 13 are flowcharts illustrating the control procedure of each CPU in the control unit.
Figure 13:
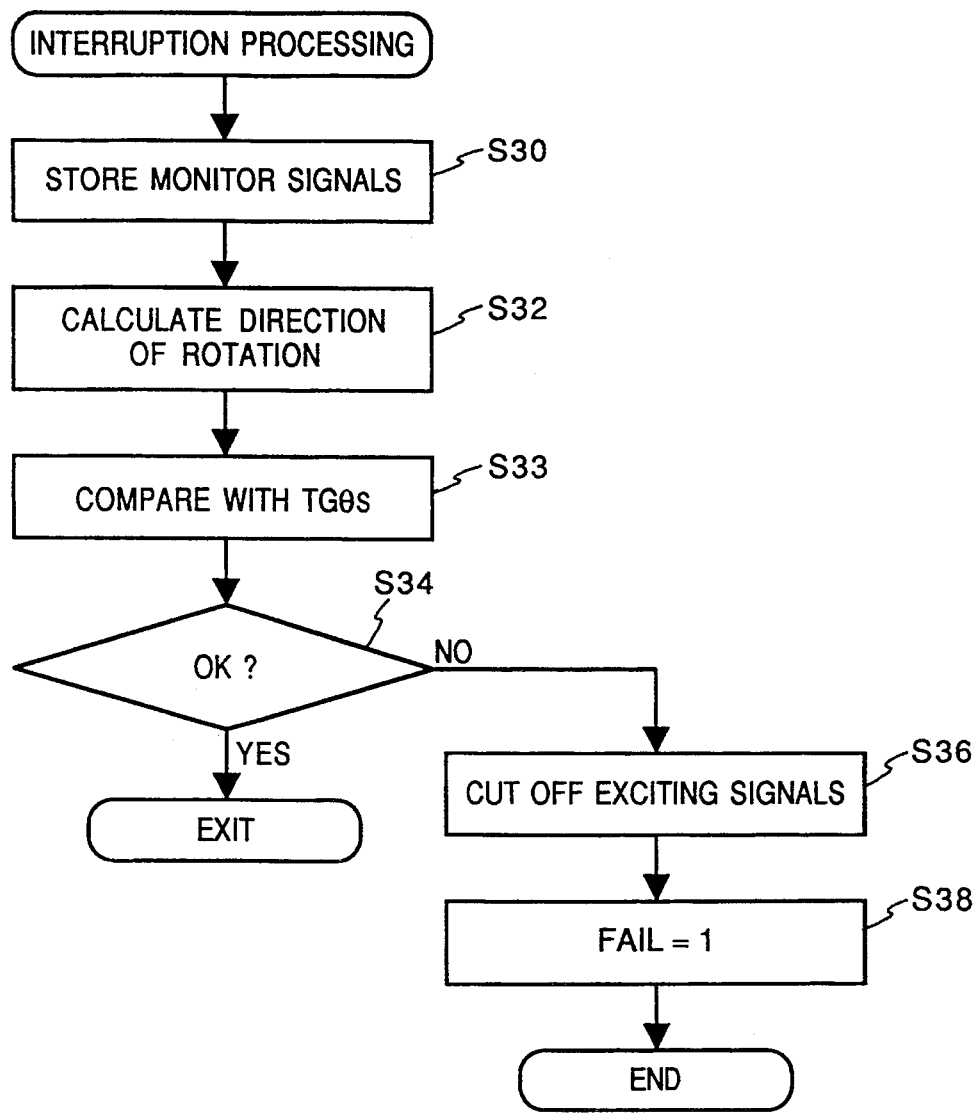

The control operations in the master CPU 100 and slave CPU 101 are described with reference to the control procedure shown in FIGS. 12 and 13. FIG. 12 is the flowchart of the main routine of the control procedure of the master CPU 100 and slave CPU 101. FIG. 13 is a procedure of interruption signal processing in each of the master CPU 100 and slave CPU 101.

At step S2 of FIG. 12, each CPU inputs the yaw rate signal $\phi$, front-wheel steering angle $\theta_F$, vehicle speed V, steering-angle-ratio $\theta_S$, FG signal, and an open circuit signal of each sensor. The "FG signal" is a revolutionary position signal which is outputted in accordance with the revolution of the step motor 56. The signal is generated as a predetermined number of pulses per revolution of the motor. At step S4, it is examined whether either one of the open circuit signals is "1". If any one of the open circuit signals is "1", it is determined as a failure of the 4WD system. At step S6, the exciting signals $A_M$, $A/_M$, $B_M$, $B/_M$ and $A_S$, $A/_S$, $B_S$, $B/_S$ are set to "0" and the exciting current to the motor is cut off. Furthermore, in order to let the oil pressure out of the power cylinder 38, the FAIL signal is set to "1" at step S8.

On the other hand, if it is confirmed that there is no open circuit at step S4, the process proceeds to step S10. At step S10, each CPU calculates the target steering-angle-ratio $TG\theta_S$ in accordance with the yaw rate signal $\phi$, front-wheel steering angle $\theta_F$, vehicle speed V, steering-angle-ratio $\theta_S$. At step S12, a steering-angle-ratio $TG\theta_S$ calculated by one CPU is transmitted to the other CPU through a bus 110 (FIG. 9). At step S14, the steering-angle-ratio $TG\theta_S$ is received from the other CPU. At step S16, the steering-angle-ratio $TG\theta_S$ calculated by the master CPU (or, $TG\theta_S$ calculated by the slave CPU) is compared with the steering-angle-ratio $TG\theta_S$ calculated by the slave CPU (or, $TG\theta_S$ calculated by the master). If they are coincident, the exciting signals ($A_M$, $A/_M$, $B_M$, $B/_M$ or $A_S$, $A/_S$, $B_S$, $B/_S$) are calculated based on the steering-angle-ratio $TG\theta_S$ at step S20 and are outputted to the motor 56 at step S22.

On the other hand, if they do not coincide, the process proceeds to steps S6 and S8 where the exciting signals are cut off and the oil pressure is let out of the power cylinder 38 by generating the fail signal FAIL.

Each CPU inputs the monitor signals $A_R$, $A/_R$, $B_R$, $B/_R$ as interruption signals. When each of these signals is inputted to the CPUs, each of the CPUs executes the interruption processing routine shown in FIG. 13. More specifically, at step S30, a current logical value of the monitor signals $A_R$, $A/_R$, $B_R$, $B/_R$ inputted as the interruption signals are stored in a memory (not shown). At step S32, the actual direction of the revolution of the motor 56 is determined on the basis of the comparison between monitor signals $A_R$, $A/_R$, $B_R$, $B/_R$ read in the previous cycle and those read in the current cycle. At step S34, it is judged whether or not the motor is revolving in a required direction on the basis of the comparison in step S33 of the target steering angle $TG\theta_S$ and direction of monitored revolution. If they do not coincide, the exciting signals are turned off at step S36 and the oil pressure is let out by generating the fail signal at step S38. Accordingly, the run away of the motor can be immediately detected by expecting the actual direction of revolution of the motor by performing the interruption processing on the monitor signals.

Figure 1:
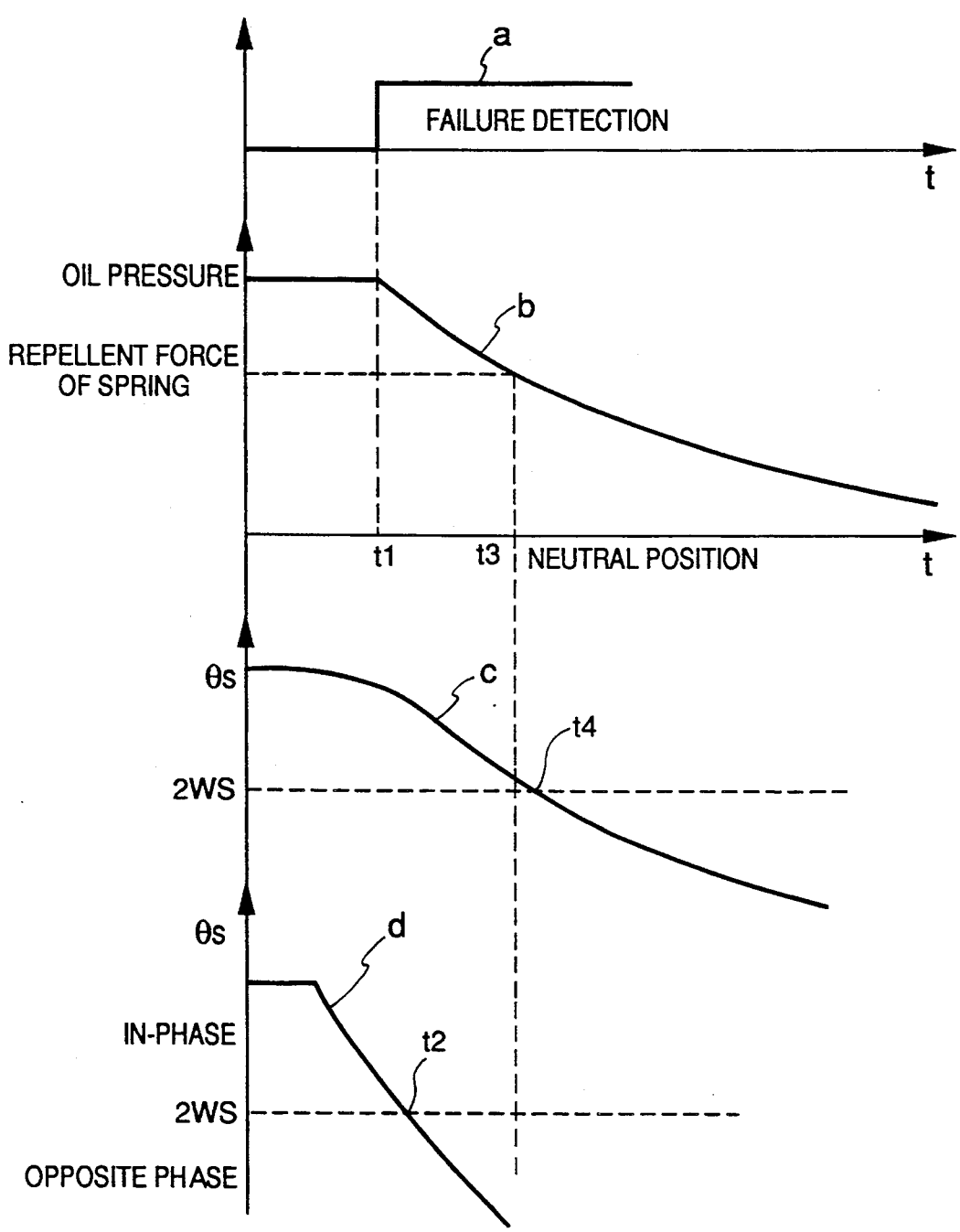
FIG. 1 is a diagram to explain a problem caused by the prior art.
Figure 14:
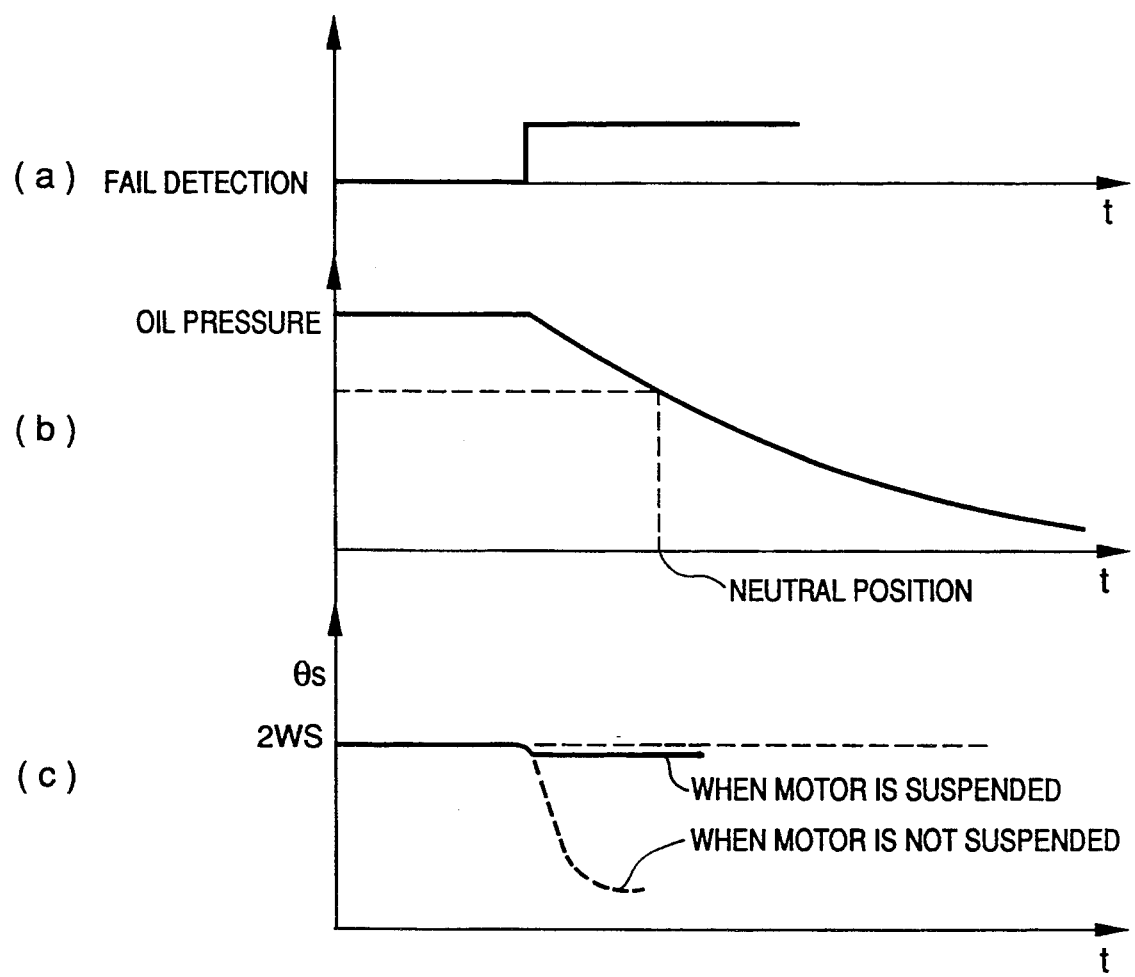
FIG. 14 is a timing chart to explain the effects when a motor suspension and hydraulic release operation are simultaneously performed at a failure occurrence.

FIG. 14 is a timing chart of the control operation in the case where a failure is detected during the "phase inversion control". Since the steering apparatus according to the present embodiment detects a motor failure in a short time, the fail-safe operation can be performed before the steering angle is changed to the opposite phase. Since when the failure is detected the fail-safe operation cuts off the motor and the oil pressure is let out, as apparent from FIG. 1, a time period during which the rear wheels being positioned out of the neutral position is reduced. Accordingly, the present apparatus assures the posture of the vehicle body in a fail safe mode even when failures are detected in the system during the phase inversion control is processed.

Meanwhile, the FG signals from the motor 56 are used for synchronizing the timing when the exciting signals are outputted from the output port 106 and the target steering-angle-ratio $TG\theta_S$ is outputted to the other CPU between the CPUs.

Modification

In the above embodiment, the functions of the two CPUs are almost equivalent. The cost of the slave CPU can be reduced by reducing loads on the slave CPU. In order to reduce the loads on the slave CPU, a modification to the embodiment is proposed as will be described below.

More specifically, the slave CPU 101 calculates the direction of revolution by inputting the monitor signal as the master CPU 100 does, in the above embodiment. It may be arranged in the modification so that this calculation is left only with the master CPU 100 and the calculation result is sent to the slave CPU 101 via the bus line 110. In other words, the slave CPU is notified of a target revolutionary direction of motor 56, while it detects an actual revolutionary direction of the motor 56.

Figure 15:
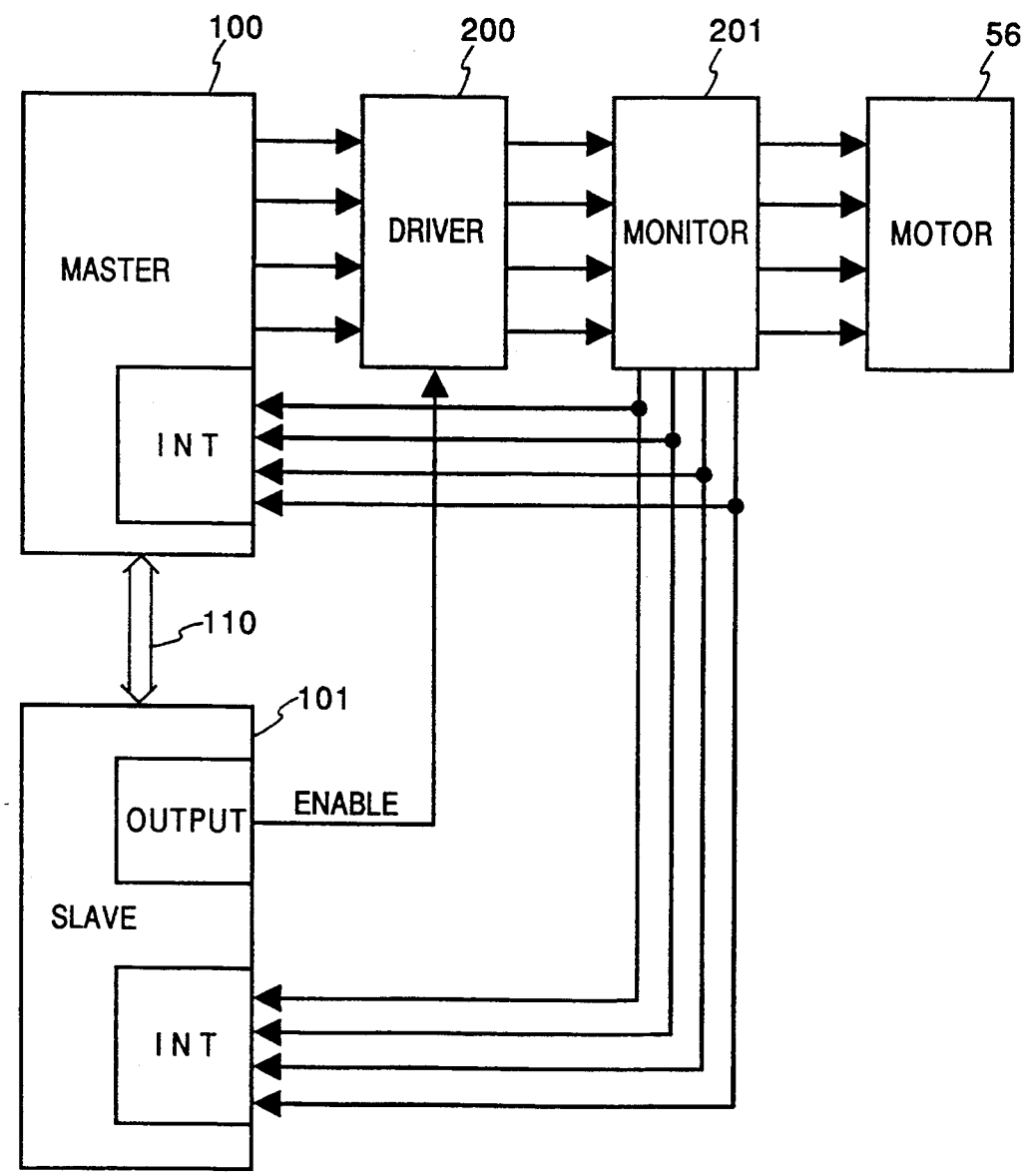
FIG. 15 is a diagram illustrating a modification to the embodiment of FIG. 2.

FIG. 15 illustrates an example of the modification. In the figure, it is arranged that only the master CPU 100 outputs the exciting signals to the motor 56 through the driver 200. The exciting signals are monitored by the monitor circuit 201 and the monitor signals are inputted to each of interruption circuits in the master CPU 100 and slave CPU 101. The slave CPU 101 examines if the target steering-angle-ratio $TG\theta_S$ is matched with the monitor signals. If there is no problem, an ENABLE signal is set to "1", while if there is a problem, it is set to "0". In the driver circuit 200, only when the ENABLE signal is "1", the exciting signal is transmitted to the motor 56.

As many apparently widely different embodiments of the present invention can be made without departing from the spirit and scope thereof, it is to be understood that the invention is not limited to the specific embodiments thereof except as defined in the appended claims

What is claimed is:
1. A rear-wheel steering apparatus which controls a phase inversion of a steering angle ratio of rear wheels when a vehicle is turned, comprising:
electric motor means for setting the steering angle ratio of the rear wheels adjustably with respect to the steering angle of front wheels;
hydraulic driving means for driving the rear wheels with an oil pressure in accordance with the steering angle ratio set by said electric motor means;

detection means for detecting a failed state in a rear-wheel steering control system;

a fail-safe valve for releasing the oil pressure from said hydraulic driving means in order to force to return the steering angle of the rear wheels to a neutral position; and control means for controlling to stop said electric motor means and controlling said fail-safe valve to release the oil pressure from said hydraulic driving means in response to a detection of the failed state.

2. The apparatus according to claim 1, wherein said electric motor means is a high-speed step motor.

3. The apparatus according to claim 1, wherein the phase inversion control of steering angle ratio is performed in a case where the speed of the vehicle is at an intermediate speed or high speed region.

4. The apparatus according to claim 1, wherein said control means controls simultaneously to perform an energizing operation of the fail-safe valve and to stop said electric motor means.

5. The apparatus according to claim 1, wherein said hydraulic driving means further comprises:

a cylinder to which an oil pressure is supplied;

a rod provided in the cylinder for steering a left rear wheel and right rear wheel; and a spring for setting the rod, when the oil pressure is released via the fail-safe valve, so that the left rear wheel and right rear wheel are returned to the neutral position.

6. The apparatus according to claim 5, further comprising an orifice in a release circuit in order to control an amount of oil to be released when said fail-save valve is operated.

7. The apparatus according to claim 6, wherein said control means controls to stop the motor means before said fail-safe valve is operated and then controls to return the rear wheels to the neutral position.

8. The apparatus according to claim 1, wherein said detection means comprises means for detecting the direction of revolution on the basis of phases of driving currents applied to the electric motor means.

9. A rear-wheel steering apparatus which controls a phase inversion of a steering angle ratio of rear wheels when a vehicle is turned, the apparatus comprising:

electric motor means for setting the steering angle ratio of the rear wheels adjustably with respect to the steering angle of front wheels;

hydraulic driving means for driving the rear wheels with an oil pressure in accordance with the steering angle ratio set by said electric motor means;

detection means for detecting a failed state in a rear-wheel steering control system;

a fail-safe valve for releasing the oil pressure from said hydraulic driving means in order to force to return the steering angle of the rear wheels to a neutral position; and control means for controlling to interrupt a current to the electric motor means and for controlling said fail-safe valve to release the oil pressure from said hydraulic driving means in response to a detection of the failed state.

10. The apparatus according to claim 9 wherein said electric motor means is a high-speed step motor.

11. The apparatus according to claim 9 wherein the phase inversion control of steering angle ratio is performed in a case where the speed of the vehicle is at an intermediate speed or high speed region.

12. The apparatus according to claim 9 wherein said control means controls simultaneously to perform an energizing operation of the fail-safe valve and to stop said electric motor means.

13. The apparatus according to claim 9 wherein said hydraulic driving means further comprises:

a cylinder to which an oil pressure is supplied;

a rod provided in the cylinder for steering a left rear wheel and right rear wheel; and a spring for setting the rod, when the oil pressure is released via the fail-safe valve, so that the left rear wheel and right rear wheel are returned to the neutral position.

14. The apparatus according to claim 13 further comprising an orifice in a release circuit in order to control an amount of oil to be released when said fail-safe valve is operated.

15. The apparatus according to claim 14 wherein said control means controls to stop the motor means before said fail-safe valve is operated and then controls to return the rear wheels to the neutral position.

16. The apparatus according to claim 9 wherein said detection means comprises a means for detecting the direction of revolution on the basis of phases of the driving currents applied to the electric motor means.

* * * * *

UNITED STATES PATENT AND TRADEMARK OFFICE
CERTIFICATE OF CORRECTION

PATENT NO. :   5,346,030

DATED :   September 13, 1994

INVENTOR(S) :   OHMURA, et al.

It is certified that error appears in the above-indentified patent and that said Letters Patent is hereby corrected as shown below:

| | |
|---|---|
| Col. 5, | line 12, delete "20". |
| Col. 6, | line 52, "mem, her" should be --member--. |
| Col. 8, | line 16, after "76" insert --,--; |
| | line 17, after "66" insert --,--. |
| Col. 10, | line 29, change "Can" to --can--. |
| Col. 11, | line 48, change ".are" to --are--. |
| Col. 12, | line 32, after "does" delete ","; |
| | line 57, change "claims" to --claims.--; |

UNITED STATES PATENT AND TRADEMARK OFFICE
CERTIFICATE OF CORRECTION

PATENT NO. :    5,346,030      Page 2 of 3
DATED      :      September 13, 1994
INVENTOR(S) :      OHMURA, et al.

It is certified that error appears in the above-indentified patent and that said Letters Patent is hereby corrected as shown below:

line 58, delete ".";

line 62, before "comprising" insert --apparatus--.

Col. 14,      line 18 (claim 10), before "wherein" insert --,--;

line 20 (claim 11), before "wherein", insert --,--;

line 24 (claim 12), before "wherein", insert --,--;

UNITED STATES PATENT AND TRADEMARK OFFICE
CERTIFICATE OF CORRECTION

PATENT NO. : 5,346,030
DATED : September 13, 1994
INVENTOR(S) : OHMURA, et al.

It is certified that error appears in the above-indentified patent and that said Letters Patent is hereby corrected as shown below:

line 28, (claim 13), before "wherein", insert --,--;

line 37, (claim 14), before "further ", insert --,--;

line 41, (claim 15), before "wherein", insert --,--;

line 45, (claim 16), before "wherein", insert --,--.

Signed and Sealed this

First Day of August, 1995

Attest:

BRUCE LEHMAN

*Attesting Officer*   *Commissioner of Patents and Trademarks*